United States Patent

[11] 3,607,865

| [72] | Inventors | John Dyer |
| | | Media; |
| | | Lyle H. Phifer, West Chester, both of Pa. |
| [21] | Appl. No. | 732,551 |
| [22] | Filed | May 28, 1968 |
| [45] | Patented | Sept. 21, 1971 |
| [73] | Assignee | FMC Corporation |
| | | Philadelphia, Pa. |

[54] PREPARATION OF XANTHATES
10 Claims, No Drawings

[52] U.S. Cl. ..................................... 260/234 R, 260/216, 260/455 B
[51] Int. Cl. ........................................ C07c 69/32
[50] Field of Search .......................... 260/455 B, 234, 216

[56] References Cited

UNITED STATES PATENTS

| 2,694,723 | 11/1954 | Schramm | 260/455 B |
| 2,761,247 | 9/1956 | Meadows | 260/216 |
| 2,825,655 | 3/1958 | Meadows | 260/216 |
| 2,910,466 | 10/1959 | Watt | 260/216 |
| 3,103,507 | 9/1963 | Knoevenagel | 260/234 |
| 3,141,012 | 7/1964 | O'Boyle | 260/234 |

*Primary Examiner*—Lewis Gotts
*Assistant Examiner*—Johnnie R. Brown
*Attorneys*—Thomas R. O'Malley, George F. Mueller and Robert G. Hoffmann

ABSTRACT: A method of forming alcohol xanthates utilizing a transxanthation reaction between an alcohol xanthate and an alcohol, is disclosed herein.

PREPARATION OF XANTHATES

Alcohol xanthic acids and their derivatives are known to be useful for a variety of applications including mineral flotation agents, sulfidizing agents, rubber vulcanization accelerators, adhesives and as intermediates in the preparation of shaped articles, for example, regenerated cellulose fibers and films.

In general, alcohol xanthates have been derived by reacting carbon disulfide with simple and complex alcohols under alkaline conditions. Reactions of this type have been known for many years and may be seen, for example, in many prior U.S. Pat. Nos., including 520,770, 1,440,962, 1,507,089, 1,642,587, 1,819,112, 1,872,452, 2,037,717-8, 2,608,572, and 2,668,820, to mention a few.

The derivative of the alcohol xanthic acid is formed as a salt during the preparation under alkaline conditions, or may be formed by replacing the salt-forming metal ion with another metal ion, an ester-forming group, carboxylic acid group, organic phosphorous group or the like, as is well known in the art.

In the above prior art method of obtaining alcohol xanthates, undesirable byproducts are formed during the reactions involving alkali, free carbon disulfide and products of the reaction. Furthermore, in the aqueous xanthate preparing systems of the prior art, xanthates of various alcohols are unstable and this, coupled with the byproduct formation, decreases process efficiency in working with the xanthate products.

Therefore, it is an object of this invention to provide a method for the preparation of an alcohol xanthate in the absence of an alkali and/or free carbon disulfide.

It is another object of this invention to provide a method for the preparation of an alcohol xanthate by a transxanthation reaction.

These and other objects are accomplished in accordance with the present invention which is a method comprising contacting is a substantially water-free liquid medium at a pH ranging from at least about 1 to no greater than about 12, a derivative of an alcohol xanthic acid with an excess of a free alcohol differing from the alcohol moiety of the xanthate for a time sufficient for a transxanthation reaction to occur. The derivatives of alcohol xanthic acid as referred to above may also be termed O-substituted dithiocarbonates.

The alcohols useful in the above method, both for the alcohol moiety of the xanthic acid derivative and the free alcohol, are intended to include alcohols in the broadest sense, and, in general, are those organic compounds which have one or more reactive hydroxyl groups available in their chemical structure and will react, either by conventional xanthating procedures or through transxanthation to form a xanthic acid or derivative thereof. These alcohols are simple monohydric, dihydric and polyhydric compounds, as well as complex alcohols and polymeric alcohols. Aliphatic and aromatic alcohols are well-known and need no exhaustive list to describe and enumerate them, but some of the more common and readily available are listed below, and their xanthate derivatives are known or are obvious:

methanol
ethanol
propanol
isopropanol
1, 3-dichloropropanol-2
n-butanol
s-butanol
t-butanol
isobutanol
pentanol
hexanol
octanol
decanol
cetyl alcohol
ceryl alcohol
melissyl alcohol
ethylene glycol
propylene glycol
glycerol
erythritol
sorbital
glucose
mannitol
2-methoxyethanol
2-ethoxyethanol
2-butoxyethanol
diethyleneglycol ethylether
polyethylene glycols
2, 3-epoxy propanol
pinacol
phenol
phenyl ethyl alcohol
phenyl propyl alcohol
chloro-phenyl ethyl alcohol
1-phenyl propanol2
benzyl 1, 4
o-hydroxybenzyl 1, 5
dihydroxybenzyl alcohol
trihydroxybenzyl alcohol
1, 4-butandiol
1, 5-pentandiol
polyvinyl alcohol
partial esters of polyvinyl alcohol
partial ethers of polyvinyl alcohol
sucrose
raffinose
starch
dextrin
gums
chitin
pentosans
galactanes
pectins
cellulose The simple alcohols, including monohydric aliphatic alcohols having from 1 to 18 carbon atoms and the polysaccharides, are probably the most useful alcohols for the preparation of the dithiocarbonate derivatives or xanthates. Cellulose, of course, is useful in various forms, including, e.g., cotton, regenerated cellulose, microcrystalline cellulose and partially esterified or etherified cellulose.

If the free alcohol for this process is a liquid at normal or elevated temperature, it can be employed as the liquid medium of the invention, or it may be mixed with another nonaqueous liquid with which it is miscible. However, dilution with another liquid will tend to slow up the transxanthation reaction. If the alcohol is a solid material, it can be dissolved or dispersed in an inert liquid medium, such as a liquid hydrocarbon, ether, ketone, amide, sulfoxide, a less reactive alcohol, or the like, for example, acetone, dioxane, dimethyl sulfoxide, cyclohexane, dimethyl formamide, isopropanol, etc.

The acidity of the liquid medium in which the method of this invention is carried out ranges in pH from at least about 1 to no greater than about 12, and preferably from about 2 to 8. Buffers and pH adjusting components may be included.

The rate of the transxanthation reaction tends to be slower when the alcohol moiety of the xanthate is more acidic than the free alcohol, while the rate of reaction tends to increase when the free alcohol is more acidic. In highly acidic reaction media, i.e., below pH 1, the transxanthation reaction is retarded owing to the more extensive protonation of the xanthic acid. On the other hand, increased alkalinity will also retard transxanthation, since it suppresses the acidity of the free alcohol. Thus, the above limitations for the pH range for the reaction are dictated by practical reasons.

Lewis acids and other acids may be used as catalysts for the reaction. It is to be expected that catalysts used to accelerate transesterification reactions, e.g., as in polyester production, would also accelerate transxanthation reactions.

The temperature of the reaction may be between the freezing and boiling points of the liquid reaction medium at atmospheric pressure, although a temperature within the range of 0° to 40° C. is preferred.

During the transxanthation reaction, alcohol which is formed from the exchange reaction and which is readily recoverable, can be removed to help increase the transxanthation yield, if desired.

When the transxanthation reaction is complete, or substantially complete, the transxanthated product and/or the alcohol or incompletely regenerated alcohol from the original alcohol xanthate can be recovered by any practical means, including decantation, centrifugation, precipitation, and distillation, depending on the nature of the product itself and any inert solvent which may have been used.

The following examples are set forth to demonstrate the method of this invention.

EXAMPLE I

A solution of 0.1 g. of potassium ethyl xanthate in 5 ml. of methanol was allowed to stand for forty hours at ambient temperature (22°–26° C.). At the end of this time, the xanthate mixture comprised 74.3 percent ethyl and 25.7 percent methyl derivative. At the end of 10 days, the mixture, precipitated by the addition of a larger volume of ether, comprised 6 percent of potassium ethyl xanthate and 94 percent potassium methyl xanthate. The activation energy for the reaction was calculated as 25.6 kilocalories. The reaction theoretically proceeds according to the chemical equation:

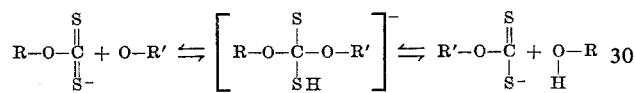

wherein the formation in brackets is an unstable transition complex.

EXAMPLE II

A solution of 0.1 g. of potassium ethyl xanthate in 5 ml. of a mixture of methanol and 4 percent potassium hydroxide stood 40 hours at ambient temperature (22°–26° C.). At the end of this time, the xanthate mixture comprised 84.3 percent ethyl and 15.7 percent methyl derivative. The activation energy for the reaction was calculated as 26.6 kilocalories. As may be seen from the above, the addition of alkali retards the xanthation reaction.

EXAMPLE III

Solutions of 0.1 g., of potassium ethyl xanthate in n-propanol and in methanol were allowed to stand for a period of days at ambient temperature (22°–26° C.), and the percentage of exchange or transxanthation was observed. The percentage of exchange in relation to time is set forth in the following table:

TABLE

| Age (days) | Methanol Solution % Ethyl Xanthate Remaining | N-Propanol Solution % Ethyl Xanthate Remaining |
|---|---|---|
| 1 | 71.0 | 96.2 |
| 3 | 44.7 | 86.3 |
| 7 | 12.4 | 63.5 |
| 10 | 6.1 | 52.6 |

The results of the above table indicate a slower reaction rate for the less acidic alcohol, n-propanol. The reaction proceeds more rapidly toward acidic free alcohols, other factors remaining constant.

The activation energy for the transxanthation reaction with n-propanol and potassium ethyl xanthate was calculated as 29.1 kilocalories.

Transxanthation reactions of the above type were carried out in the presence of different diluent liquids or solvents. In all cases, the alcohol concentration was greatly in excess of the xanthate. The xanthates were insoluble in the non-polar solvents, cyclohexane and ether, and soluble in dioxane, water and acetone. The rate of exchange was not influenced by the alcohol to solvent ratio in cyclohexane and ether; however, in acetone, dioxane and water, exchange was retarded by decrease alcohol to solvent ratio. The retarding effect was greatest for water.

EXAMPLE IV

Solutions of potassium ethyl xanthate in methanol mixtures were prepared wherein the acid concentration was varied to provide solution pH's ranging from 5 down to about 0.5. As the acidity of the solution was increased, the exchange rate increased and passed through a maximum at about 1.5 and decreased rapidly at lower pH, It should be noted that some xanthate decomposition also occurs in acidic solution mixtures. Useful acids include organic and mineral acids, for example, acetic, phosphoric, hydrochloric and sulfuric acids. Alkali metal salts may be included for this buffering action.

EXAMPLE V

Water and alkali were removed from thin films of viscose by washing with sodium sulfate and ethanol. The cellulose xanthate films were contacted with ethylene glycol. After approximately 4 hours at ambient temperature, the cellulose was completely regenerated as a clear film and all the xanthate was recovered as the ethylene glycol derivative.

EXAMPLE VI

Methanol, ethanol, propanol and isopropanol were contacted with films of cellulose xanthate as in example V. The rate of simple alcohol xanthate formation was in the order

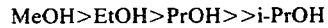

EXAMPLE VII

Phenol xanthate was formed when potassium ethyl xanthate was dissolved in molten phenol.

Some of the advantages of the method of this invention are:
1. The preparation of xanthates without the use of alkali and free carbon disulfide is possible.
2. Recovery and reuse of alcohol byproduct is possible.
3. Xanthates produced through this method are not subject to hydrolytic degradation.
4. Xanthates produced through this method are more stable in the absence of water.
5. The method involves little or no undesirable byproduct formation.
6. An alkaline alcoholic preparation of cellulose or other polysaccharide xanthate may be formed into a shaped article and at least partially regenerated in an acidic alcohol solution by transxanthation. The free alcohol and the alcohol xanthate formed may be recovered and reused.

Other advantages for the method of this invention will be readily apparent to those skilled in this art.

Various changes and modifications may be made practicing this invention without departing from the spirit and scope thereof, and therefore, it is not to be limited except as indicated by the appended claims.

We Claim:
1. A method for the preparation of an alcohol xanthate which comprises contacting in a substantially water-free liquid medium at a pH ranging from at least about 1 to no greater than about 12 and in the absence of a catalyst or in the presence of an acidic catalyst, a derivative of an alcohol xanthic acid with an excess of a free alcohol differing from the alcohol moiety of the alcohol xanthic acid for a time sufficient for a transxanthation reaction to occur, said free alcohol and said alcohol moiety of the xanthate consisting of alcohols selected from aliphatic alcohols, phenol, phenyl lower alcohols and polysaccharides 2. The method of claim 1 wherein the alcohol moiety of said derivative of an alcohol xanthic acid is derived from a monohydric aliphatic alcohol having from 1 to 18 carbon atoms.

3. The method of claim 1 wherein said free alcohol is a monohydric aliphatic alcohol having from 1 to 18 carbon atoms.

4. The method of claim 1 wherein the alcohol moiety of said derivative of an alcohol xanthic acid is derived from a polysaccharide.

5. The method of claim 1 wherein said free alcohol is a polysaccharide.

6. The method of claim 1 wherein the pH ranges from about 2 to about 8.

7. The method of claim 1 wherein the temperature at which the transxanthation reaction is carried out ranges from about 0 to about 40° C.

8. The method of claim 1 wherein a transxanthated derivative product is recovered.

9. The method of claim 1 wherein the alcohol or incompletely regenerated alcohol from said derivative of alcohol xanthate is recovered as a shaped article.

10. The method of claim 9 wherein the alcohol is cellulose or an incompletely regenerated cellulose.

UNITED STATES PATENT OFFICE
CERTIFICATE OF CORRECTION

Patent No. 3,607,865　　　　　　　Dated September 21, 1971

Inventor(s) John Dyer and Lyle H. Phifer

It is certified that error appears in the above-identified patent and that said Letters Patent are hereby corrected as shown below:

Column 1, line 36, "is" should read -- in --.
Column 2, line 17, "benzyl 1,4" should read -- benzyl alcohol --;
Column 2, line 18, "o-hydroxybenzyl 1,5" should read -- o-hydroxybenzyl alcohol --.
Column 4, line 9, "decrease" should read -- decreased --.

Signed and sealed this 25th day of April 1972.

(SEAL)
Attest:

EDWARD M.FLETCHER,JR.　　　　　　　ROBERT GOTTSCHALK
Attesting Officer　　　　　　　　　　Commissioner of Patents